(12) United States Patent
Hoshino et al.

(10) Patent No.: US 6,442,118 B1
(45) Date of Patent: Aug. 27, 2002

(54) INFORMATION RECORDING AND REPRODUCING APPARATUS HAVING SEMICONDUCTOR LASER DRIVE CIRCUITRY IN ITS PICKUP

(75) Inventors: Takashi Hoshino, Yokohama; Toshimitsu Kaku, Ibaraki; Akihiro Asada; Takehiko Sekine, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/488,156

(22) Filed: Jan. 20, 2000

(51) Int. Cl.[7] ............................................. G11B 7/0045
(52) U.S. Cl. ................. 369/47.3; 369/47.19; 369/47.51
(58) Field of Search .......................... 369/47.3, 47.51, 369/47.19, 47.28

(56) References Cited

U.S. PATENT DOCUMENTS

| | | | | |
|---|---|---|---|---|
| 5,235,422 A | * | 8/1993 | Ido et al. | 358/158 |
| 5,943,307 A | * | 8/1999 | Takagi et al. | 369/54 |
| 5,956,313 A | * | 9/1999 | Maegawa et al. | 369/116 |
| 6,157,603 A | * | 12/2000 | Okubo et al. | 369/50 |
| 6,195,325 B1 | * | 2/2001 | Okanishi | 369/124.08 |
| 6,278,567 B1 | * | 8/2001 | Nagasawa | 360/51 |

* cited by examiner

Primary Examiner—W. R. Young
Assistant Examiner—Gautam R. Patel
(74) Attorney, Agent, or Firm—Townsend and Townsend and Crew LLP

(57) ABSTRACT

A laser waveform generation function is provided in a laser driving waveform generator 2 near a laser 3. A recording clock generator 9 is included in the laser driving waveform generator 2 to generate a clock with a frequency higher than that of a synchronizing clock 202. This allows a recording laser current (waveform) to be generated without transmission of a high frequency signal from the modulator 6. Further, because the synchronizing clock 202 is stopped upon a reproduction operation including reproduction operation in an ID unit, undesired effects on a reproduction operation such as ID reproduction can be reduced. Because the response speed of the recording clock generator 9 can be changed, a high precision clock can be generated. Thus, a high-precision recording laser current (waveform) can be generated.

15 Claims, 14 Drawing Sheets

INFORMATION RECORDING AND REPRODUCING APPARATUS HAVING SEMICONDUCTOR LASER DRIVE CIRCUITRY IN ITS PICKUP

BACKGROUND OF THE INVENTION

The present invention relates to an information recording and reproducing apparatus which records information onto a medium using a laser beam with an emission waveform controlled by the recording information, and reproduces information from the medium by use of a laser beam with a lower intensity than that of the laser beam used for recording. More particularly, the invention provides an optical disk drive with a circuit to generate a desired waveform for the laser beam.

SUMMARY OF THE INVENTION

According to an aspect of the present invention, an information recording and reproducing apparatus records information using a precise laser current waveform, and reduces undesired effects during reproduction operations, such as ID reproduction.

More particularly, the invention provides an information recording and reproducing apparatus, such as an optical disk drive, for recording information onto a recording medium while changing the laser emissions. The apparatus includes a movable optical pickup unit which has a modulator that incorporates data to be recorded onto the recording medium using a synchronizing clock, a recording waveform generator having a recording clock generator that generates a recording clock based on the synchronizing clock. The waveform generator changes the laser emissions based on the recording clock and the recording data. A controller is provided to control the modulator and the recording waveform generator. Preferably, the recording waveform generator is formed on a circuit board of the optical pickup unit, and the modulator and the controller are formed on a circuit board other than that of the optical pickup unit. The recording clock generator turns the recording clock on and off based on control by the recording controller.

DESCRIPTION OF THE SPECIFIC EMBODIMENTS

One embodiment of an information recording and reproducing apparatus of the present invention includes, a modulator for providing recording data to be recorded onto a recording medium; a synchronizing clock; a recording waveform generator having a recording clock generator for generating a recording clock based on the synchronizing clock for changing the amount of laser emission based on the recording clock and the recording data; and a recording controller for controlling the modulator and the recording waveform generator. In this embodiment, the recording clock generator has a clock generation/stop function and a response speed changing function, and the recording controller generates a clock generation/stop control signal and a response speed changing signal for control of the recording clock generator.

Figure 2:
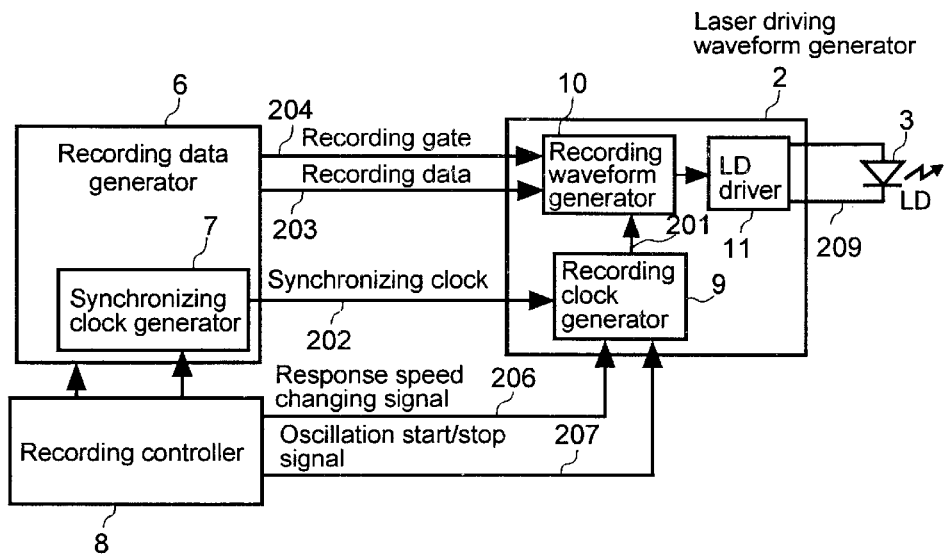
FIG. 2 is a diagram showing a modulator and a circuit for providing a laser driver.
Figure 16:
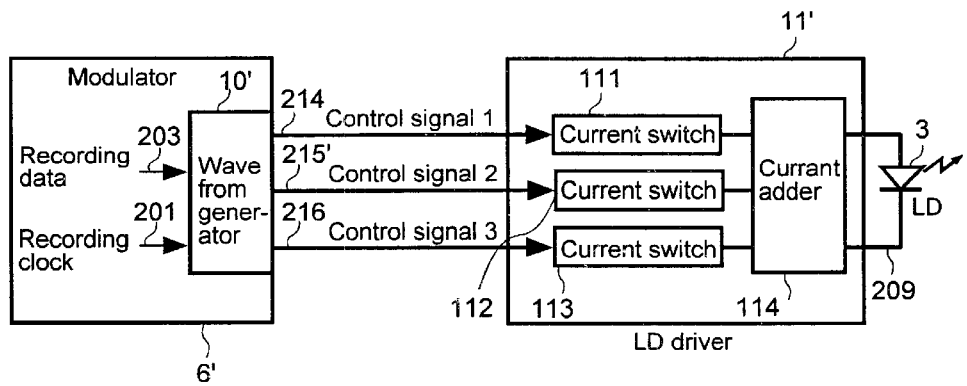
FIG. 16 is a diagram showing a modulator (laser waveform generator) and a laser driver.

FIG. 2 shows an embodiment of a modulator and waveform generator circuit for controlling a laser. The waveform generator 2 includes an LD driver 11 comprising, e.g., current switches and an adder as shown in FIG. 16, but is not limited to this arrangement. Further, waveform generator 10 and the LD driver 11 are not necessarily integrated, but may be separately constructed. Recording controller 8 provides start and stop signals to a recording-clock generator and also provides a signal to the recording-clock generator to change its response speed.

In FIG. 2, signal lines transmit a synchronizing clock 202, recording data 203, a recording gate signal 204, a response speed signal 206 and an oscillation start/stop signal 207. These are connected between the modulator 6, the recording controller 8, and the waveform generator 2, using a flexible cable (not shown) or the like. The waveform generator 2 is preferably provided on an optical pickup unit (not shown), and thus moves with movement of the optical pickup unit. The modulator 6 and the recording controller 8 are provided on a substrate (not shown) in the information recording and reproducing apparatus, and thus do not move with the optical pickup unit.

Figure 3:
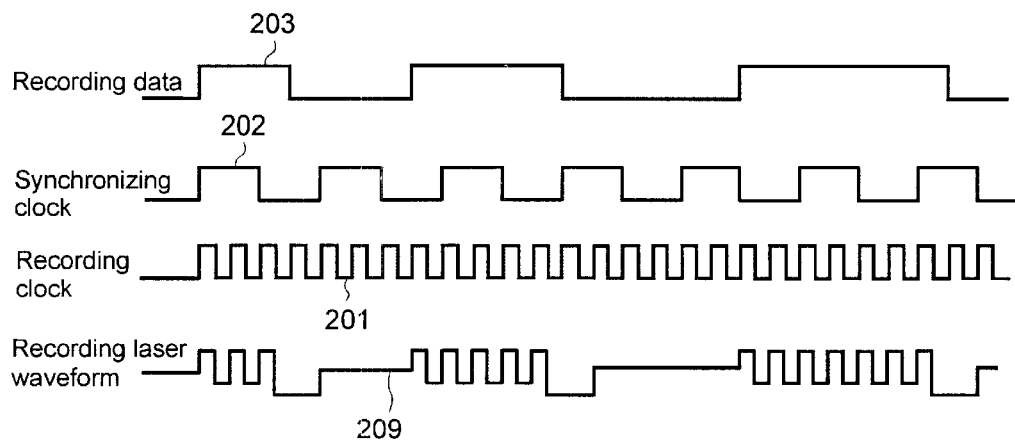
FIG. 3 is a diagram showing the relation among recording data, a synchronizing clock, a recording clock and a recording laser waveform.

The flow of signals between the modulator 6 and the waveform generator 2 is described with reference to FIG. 3 showing the relation among the recording data 203, the synchronizing clock 202, the recording clock 201 and the recording laser waveform 209. Recording clock generator 9 generates the recording clock signal 201 based on the synchronizing clock signal 202 from the synchronizing clock generator 7, and sends the recording clock 201 to the waveform generator 10. The waveform generator 10 generates the waveform for controlling current to the recording laser 209, based on the recording data (e.g., NRZ signal) 203 sent from the modulator 6 and the recording clock 201 sent from the recording clock generator 9. The emission of laser 3 changes in accordance with changes of the waveform of the laser current 209. The LD driver I 1 drives the laser 3 based on the recording laser current 209, thus causing the laser to record on an information recording medium.

In these figures, the synchronizing clock 202 is one-fourth the frequency of the recording clock 201. The frequency of the synchronizing clock 202 is not limited to this frequency, but may be an arbitrary 1/N frequency. Because a Phase Locked Loop circuit (PLL) is often used as the recording clock generator 9, and to simplify circuit construction, it is preferable that N be set to a power of 2. Further, as N increases, jitter of the synchronizing clock increases, therefore, it is preferable that N be determined in view of these conditions.

The signal timing of the modulator 6 and the waveform generator 9 are described with reference to FIG. 1. During a reproduction operation, because the recording clock 201 is not necessary, the recording controller 8 issues the oscillation start/stop signal 207 to the recording clock generator 9 to stop oscillation of the recording clock 201. Accordingly, interference with other circuits during reproduction operations is prevented. Further, the recording controller 8 stops supply of the synchronizing clock 202 from the synchronizing clock generator 7 to the recording clock generator 9.

For a recording operation, it is necessary to start oscillation of the recording clock 201. Generally, during a seek operation for movement of the head to a target position, the oscillation of the recording clock 201 is started. In this case, the synchronizing clock 202 is supplied from the synchronizing clock generator 7 in modulator 6. Upon start of the oscillation of the recording clock 201, because the recording clock 201 is not synchronized with the synchronizing clock 202, a synchronizing operation is performed. To complete the synchronizing operation quickly, it is necessary to increase the loop gain of the PLL of the recording clock generator 9. Because the recording clock generator 9 is easily influenced by external disturbances when the loop gain is high, it is preferable to reduce the loop gain after the synchronization, i.e., to set the response speed to a lower speed. For this purpose, the response speed of the recording clock generator 9 is changed by the response speed changing signal 206 issued from the recording controller 8. Thus, a high precision recording clock can be generated by changing the circuit characteristic of the recording clock generator 9. Note that in FIG. 1, the response speed is switched to a lower speed after the recording operation for one sector, however, it may be arranged such that the response speed is set to a high speed only during a seek operation period, then switched to the lower speed upon start of the recording operation.

Figure 4:
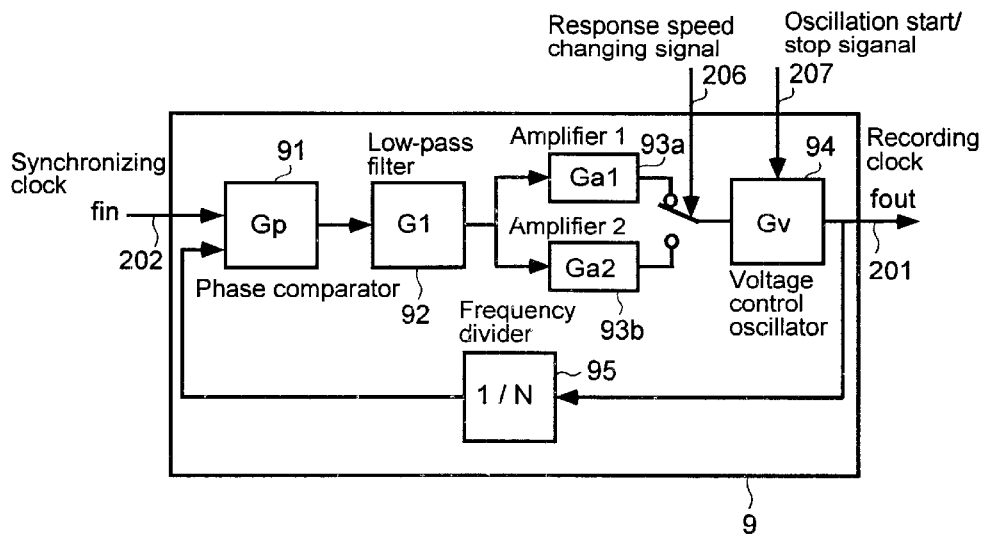
FIG. 4 is a diagram showing a recording clock generator according to a first embodiment.

Next, an example of the structure of the recording clock generator 9 is described with reference to FIG. 4. This structure is a PLL, a well known circuit. In FIG. 4, "fin" corresponds to the synchronizing clock 202; "Gp", to the gain of phase comparator 91; "Gf", to the gain of low-pass filter 92; "Ga1" and "Ga2", to the gains of amplifiers 93a and 93b; "Gv", to gain of a voltage control oscillator 94; "N" to a feedback frequency ratio of a frequency divider 95; and "fout" to an output clock, i.e., recording clock 201. Note that the "fout" 201 is not necessarily the recording clock 202, but a clock obtained by dividing the "fout" may be used as the recording clock 202. The loop gain of the PLL is changed by selecting the gain Ga1 of the amplifier 93a or the gain Ga2 of the amplifier 93b.

Returning to the explanation of the control of modulator 6 and the waveform generator 9, after completion of the recording operation, because the recording clock 201 is not necessary, the recording controller 8 issues the oscillation start/stop signal 207 to the recording clock generator 9 to stop the oscillation of the recording clock 201. Accordingly, interference with other circuits during the reproduction operation is prevented. Further, the recording controller 8 prevents supply of the synchronizing clock 202 from the synchronizing clock generator 7 to the recording clock generator 9.

Figure 1:
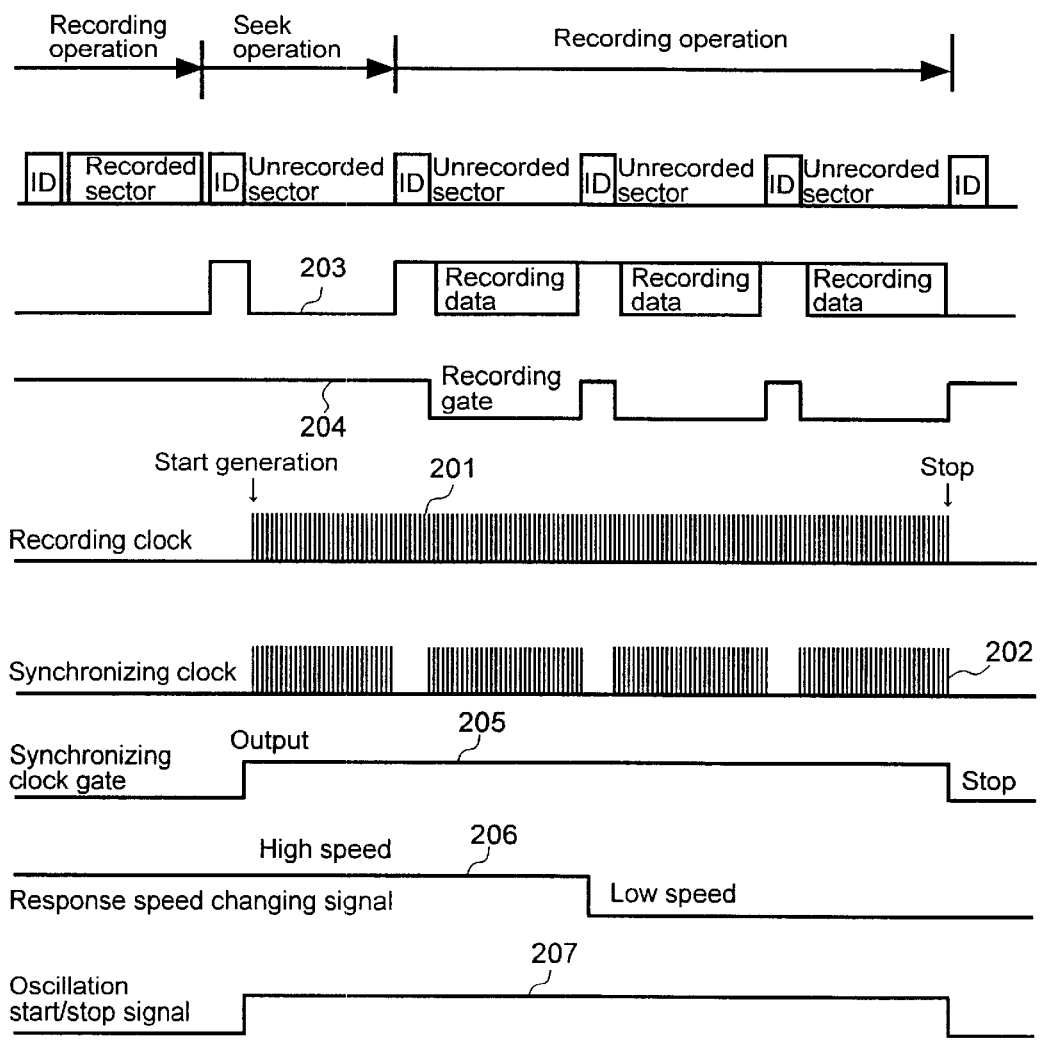
FIG. 1 is a timing diagram showing a control operation of the present invention.

Note that as shown in FIG. 1, the synchronizing clock 202 is stopped in a sector ID unit so as to prevent interference by the synchronizing clock 202 to the reproduction operation. In this case, when the recording clock generator 9 detects a dropout (stoppage) of the synchronizing clock, it holds the oscillation frequency at the value before the dropout, and the recording clock 201 is continuously supplied to the waveform generator 10. Accordingly, in a recording operation, it is not necessary to perform a synchronizing operation at each sector change, therefore, it is not necessary to change the response speed of the recording clock generator 9 using the response speed changing signal at each sector change. Thus, stable and high precision recording operations can be performed.

Figure 5:
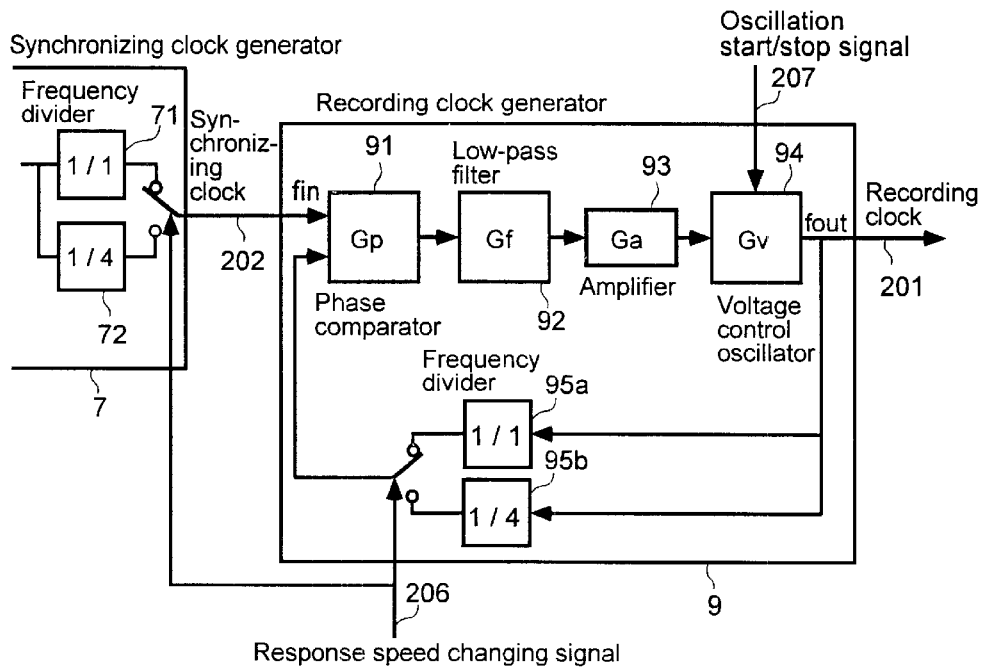
FIG. 5 is a diagram showing the recording clock generator according to a second embodiment.

FIG. 5 is a second example of the recording clock generator 9. In this example, the loop gain is changed by changing the feedback frequency dividing ratio N of the recording clock generator (PLL) 9. If the ratio N is reduced (the minimum value is 1), the gain increases. The gain is changed by selection of an N=1 frequency divider 95a and an N=4 frequency divider 95b. Note that when the feedback frequency dividing ratio N is changed, the frequency of the synchronizing clock 202 must be changed at the same time. Accordingly, the response speed is changed by the response speed changing signal 206, and at the same time, the frequency dividing ratio of the synchronizing clock generator 7 in the modulator 6 is changed by selection of frequency dividers 71 and 72. Using this method, the change of response speed is achieved with a digital circuit. Because loss of synchronization might occur, it is preferable that the change of response speed be performed when the PLL holds the value prior to the change of frequency dividing ratio as a phase comparison error. At the control timing in FIG. 1, it is realized by changing the frequency dividing ratio during an ID reproduction operation.

Figure 6:
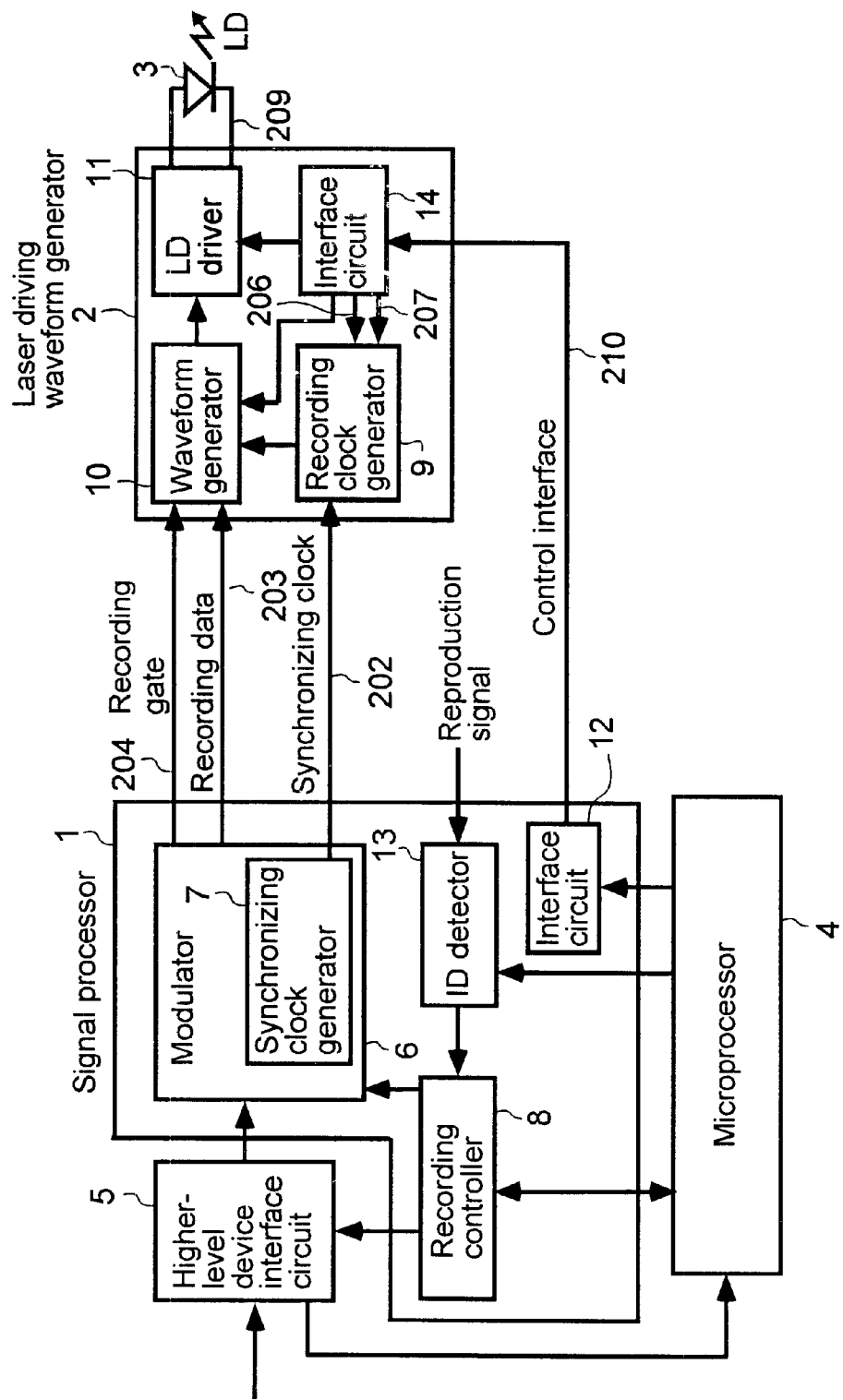
FIG. 6 is a diagram showing a first embodiment of an information recording and reproducing apparatus using the modulator and the waveform generator in FIG. 2.

FIG. 6 illustrates a first embodiment of the information recording and reproducing apparatus using the above-described modulator and the laser driving waveform generator. In this embodiment, control by the waveform generator 2 can be realized, not by providing signal lines having independent functions, but by providing a single control interface signal 210 to transfer data corresponding to the control content. In FIG. 6, a signal line to transmit the synchronizing clock 202, the recording data 203, a recording gate signal 204 and the control interface signal 210 is connected as a flexible cable (not shown) between a signal processor 1 and the laser driving waveform generator 2.

Because the waveform generator 2 is provided in the optical pickup unit (not shown), the waveform generator 2, including the recording clock generator (PLL) 9, moves with the movement of the optical pickup unit. On the other hand, the signal processor 1, including the modulator 6, is provided on the substrate (not shown) fixed to the information recording and reproducing apparatus. Thus, the signal processor 1 does not move with the movement of the optical pickup unit.

Figure 7:
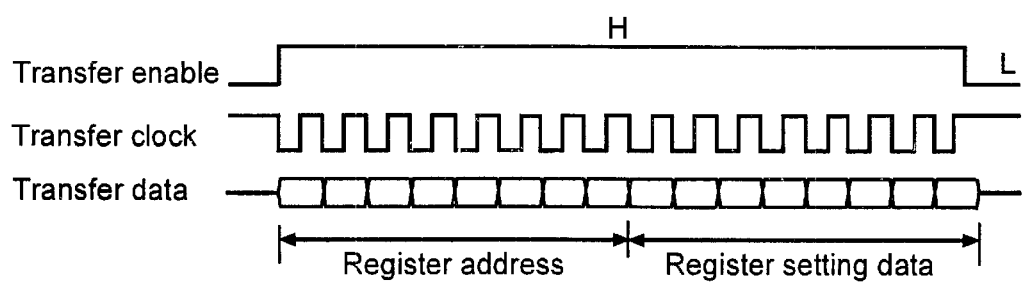
FIG. 7 is a diagram showing an example of a control interface signal.

FIG. 7 is an example of the control interface signal 210 in serial form, although no limitation is posed on the format of the control interface signal 210. The serial interface signal includes three signal lines, one for a transfer enable signal, one for a transfer clock, and one to transfer data. When the level of the transfer enable signal is "H", the interface is in an operating state, and the transferred data is provided in synchronization with the transfer clock. In the transfer data the first-half 8 bits represent an address of one of various setting registers included in the laser driving waveform generator, and the last half 8 bits represent data written at the address.

The waveform generator 2 receiving the data separates the transfer data into the register address and the register setting data using an interface circuit 14, and writes the data into a register of the designated address. The signal processor 1, including an interface circuit 12 between the modulator 6 and the waveform generator 2, is connected to the higher-level device interface circuit 5, for data transfer with a higher level external device such as a PC (not shown).

The higher level device also issues recording and reproduction requests (commands) and provides data to be recorded to the information recording and reproducing apparatus. A microprocessor 4 receives these commands from the higher-level device interface circuit 5, and controls the respective elements in the information recording and reproducing apparatus. Similarly, the waveform generator 2 of the present invention is controlled by the microprocessor 4 placing predetermined information into the interface circuit 12 to drive the control interface circuit 14.

Figure 10:
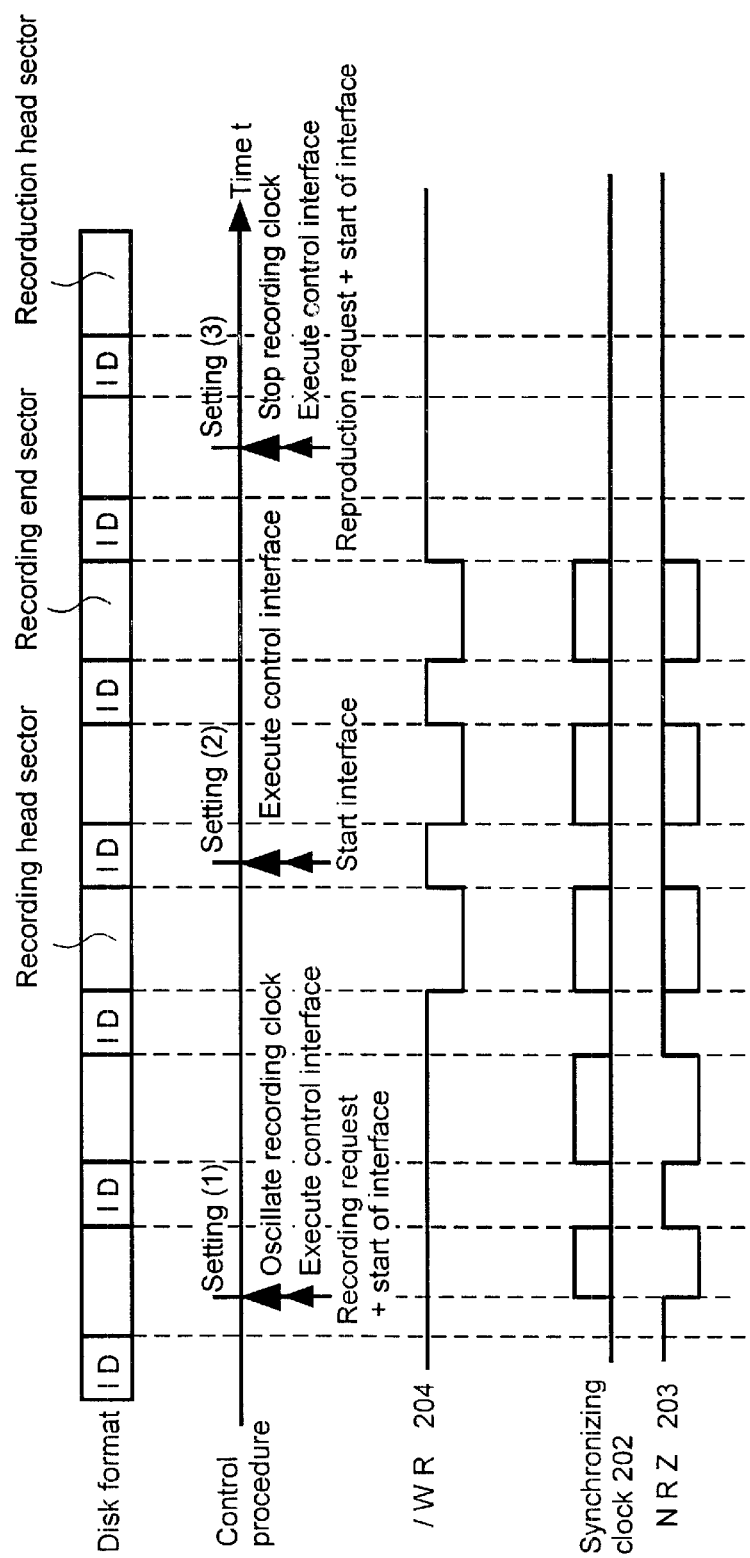
FIG. 10 is a diagram showing an example of an operation sequence in a first embodiment of the information recording and reproducing apparatus.

FIG. 10 shows the control procedure (operation sequence) for normal operation according to the present invention. Setting (1) is used for a high-speed synchronization mode with oscillation of the recording clock (ON), while setting (2) is used for a low-speed synchronization mode with oscillation of the recording clock (ON). Setting (3) is used for a recording clock stop (OFF) mode. When a recording command is issued from the higher-level (external) device, the microprocessor 4 places the information into the interface circuit 12 to drive the control interface circuit 14, which sets the waveform generator 2 to a predetermined state. At the same time, microprocessor 4 also controls clock generator 7 in modulator 6, to generate the synchronizing clock 202. Microprocessor 4 also sets a recording start sector in the ID detector 13. When the ID detector 13 detects the recording start sector, it notifies the recording controller 8 of the detection of the recording start sector. The recording controller 8 controls the modulator 6, to send the recording gate 204 (/WR) and the recording data 203 (NRZ) to the waveform generator 10. As described above, the waveform generator 10 generates the recording laser current waveform 209 based on the recording data (e.g., NRZ signal) 203 from the modulator 6 and the recording clock 201 from the clock generator 9. Then, the LD driver 11 drives the laser 3 based on the waveform 209, to perform recording on the information recording medium.

When recording for a sector is complete, microprocessor 4 places the setting (3) information into the interface circuit 12 to drive the control interface circuit 14, to set the waveform generator 2 to the setting (2) within an ID reproduction period following the recording. When a read-out command (reproduction request) is issued, the microprocessor 4 places the information of the setting (3) into the interface circuit 12 to drive the control interface, to set the laser driving waveform generator to the setting (3).

In the recording and reproducing apparatus of the first embodiment described above, the waveform generation function is performed not by a circuit on the substrate within the apparatus (the modulator 6), but by a circuit on the optical pickup unit near the laser 3. Further, the clock generator 9 is included in the circuit on the optical pickup unit (the waveform generator 2), to generate a clock having a frequency higher than that of the synchronizing clock 202. In this construction, because a recording laser waveform can be generated without transmission of a high frequency signal from the modulator 6, the waveform generator 2 is not easily influenced by delay among the signals, and information can be recorded with high precision using the provided waveform. Further, because the supply of the synchronizing clock 202 is stopped at a reproduction operation, including the sector ID reproduction operation, undesirable effects on the reproduction operation are reduced. Further, because a high precision clock can be generated by changing the response speed of the clock generator 9, a high-precision recording laser current waveform can be generated, and information can be recorded with high precision.

Figure 8:
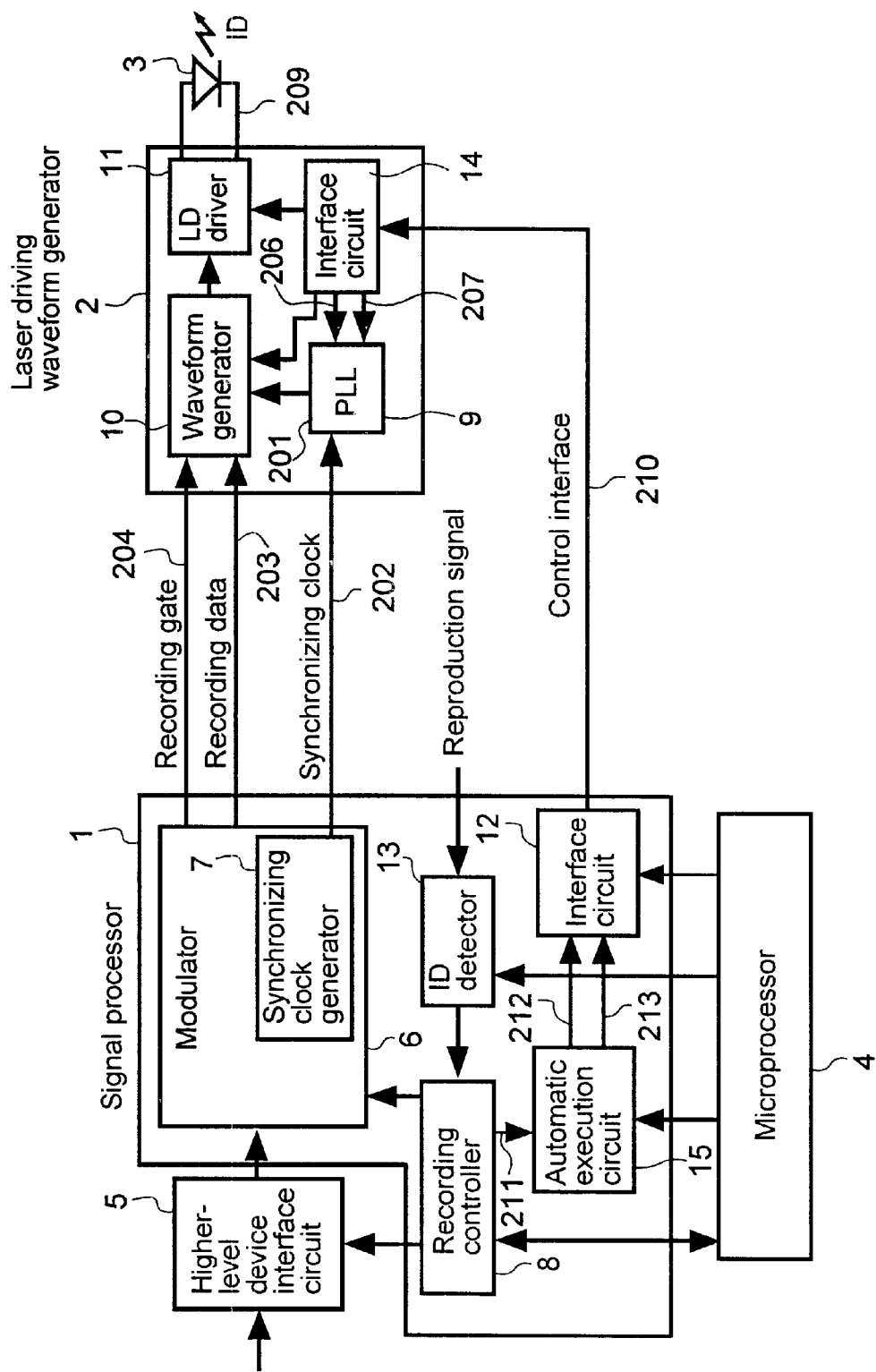
FIG. 8 is a diagram showing a second embodiment of the information recording and reproducing apparatus using the modulator and waveform generator in FIG. 2.

FIG. 8 shows a second embodiment of the information recording and reproducing apparatus to which the above-described modulator and the laser driving waveform generator are applied. Explanation corresponding to those same aspects of the first embodiment are omitted. The second embodiment differs from the first embodiment by providing an automatic execution circuit 15 in the interface circuit 12. The other components are same as those in the first embodiment, and therefore, are not discussed again.

In the first embodiment, the microprocessor 4 must always detect the start and ending timing of a sector to control the waveform generator 2. This, however, may cause an overload on the microprocessor operation. Because the automatic execution circuit 15 is provided, the microprocessor 4 outputs recording and reproduction requests to the recording controller 8 regardless of sector status. Thus, it is not necessary for the microprocessor 4 to always exactly detect the start and ending timing of a sector; therefore, the load on the microprocessor 4 can be reduced, improving processing speed of the entire apparatus.

Figure 9:
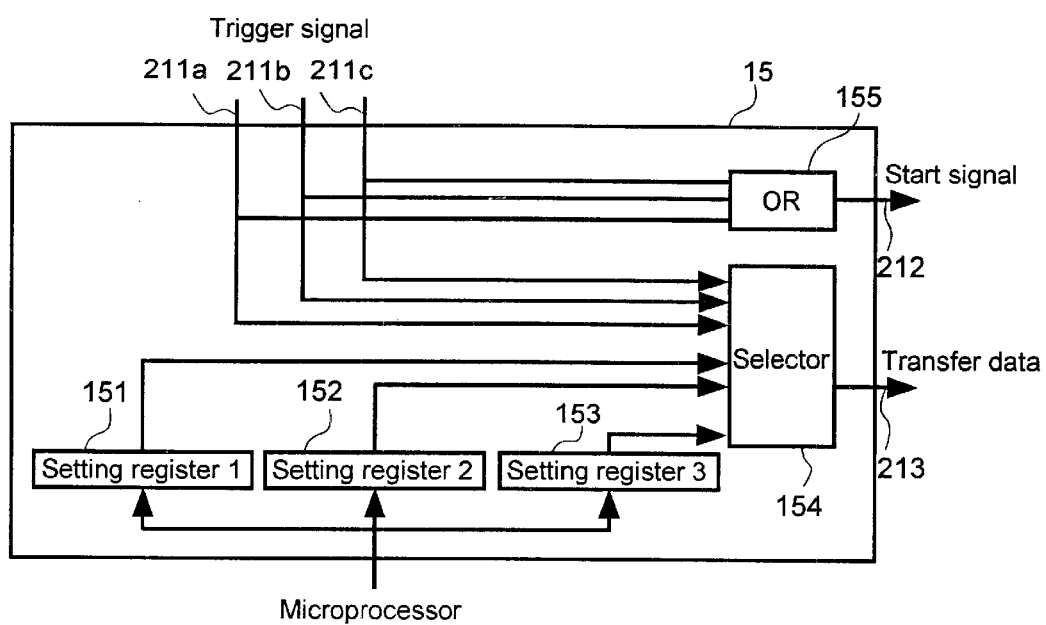
FIG. 9 is a diagram showing an example of an automatic execution circuit.

FIG. 9 is an example of the automatic execution circuit 15. In this figure, registers 151 to 153 for holding 3 types of settings are provided. When power to the drive is turned on, for example, when a disk is inserted, or when a disk is exchanged for another disk, setting information is written from the microprocessor. The recording controller 8 provides 3 types of trigger signals 211a, 211b, and 211c to the automatic execution circuit 15. The automatic execution circuit 15 provides a start signal 212 for the interface circuit 12. At the same time, the automatic execution circuit 15 supplies corresponding register data 213 to the interface circuit 12. When the start signal 212 is received, the interface circuit 12 reads the register data 213 from the automatic execution circuit 15, and supplies the data to the control interface 210.

Figure 11:
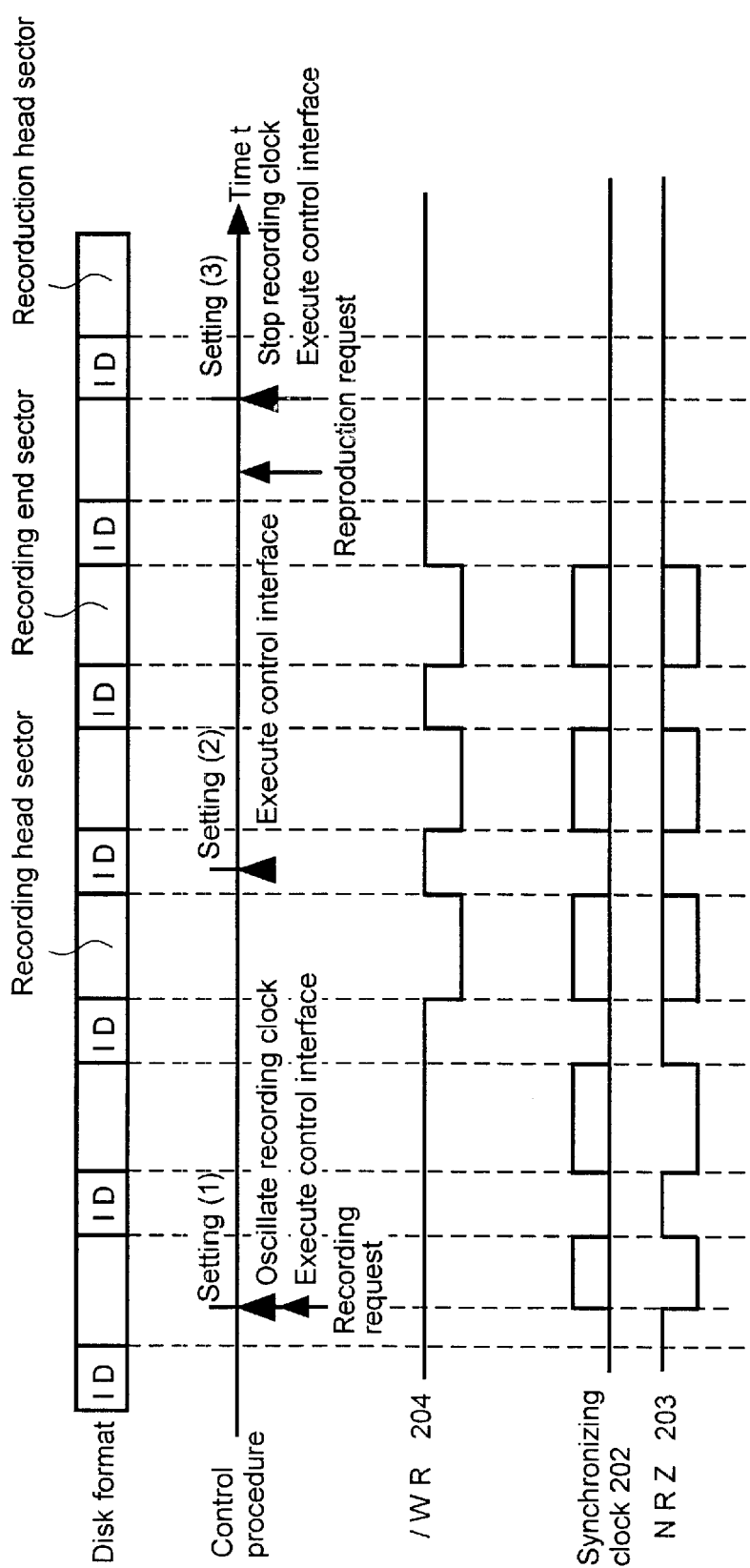
FIG. 11 is a diagram showing an example of an operation sequence in a second embodiment of the information recording and reproducing apparatus.

FIG. 11 is an example of the operation sequence of the second embodiment. For recording, the microprocessor provides a recording request to the signal processor 1 to set a recording head sector in the ID detector 13. If the recording controller 8 does not perform other recording reproduction at that time, it supplies a trigger signal 1 (211a) to the automatic execution circuit 15. The automatic execution circuit 15 operates the interface circuit 12, and outputs the content of the setting register 1, set in advance, to the laser driving waveform generator 2, so as to set the state of the setting (1). At the same time, the recording controller 8 provides the synchronizing clock 202. When the ID detector 13 detects the recording head sector, recording is started. When the recording for a sector has been completed, the recording controller 8 sends a trigger signal 2 (211b) to the automatic execution circuit 15 within the ID reproduction period following the recording for that sector. The automatic execution circuit 15 operates the interface circuit 12 to supply the contents in the setting register 2 to the waveform generator 2, to set the waveform generator to the state of the setting (2). If the response speed is changed by changing the frequency dividing ratio of a reference clock, the frequency dividing ratio of the synchronizing clock generator is changed at the same time.

For reproduction operations, the microprocessor 4 sends a reproduction request to the signal processor 1, setting a reproduction head sector address. The recording controller 8 provides a trigger signal 3 to the automatic execution circuit 15 after the recording end sector. The recording controller performs a recording operation upon reception of the reproduction request, or after the current sector. The automatic execution circuit 15 operates the interface circuit 12 to transmit the contents set in the setting register 3 to the waveform generator 2, to set the waveform generator to the state of the setting (3), i.e., recording clock stop state.

According to the information recording and reproducing apparatus of the second embodiment as described above, in addition to the advantages of the first embodiment, the automatic execution circuit 15 reduces the load on the microprocessor 4 and improves the operation processing speed of the entire apparatus.

Next, various operating conditions of the recording and reproducing apparatus in the first and second embodiments are described. The following description is of the first embodiment; however, setting (I) means issuance of the trigger signal 1 (211a) in the second embodiment; setting (2) means issuance of the trigger signal 2 (211b) in the second embodiment; and setting (3) means issuance of the trigger signal 1 (211c) in the second embodiment are used.

Figure 12:
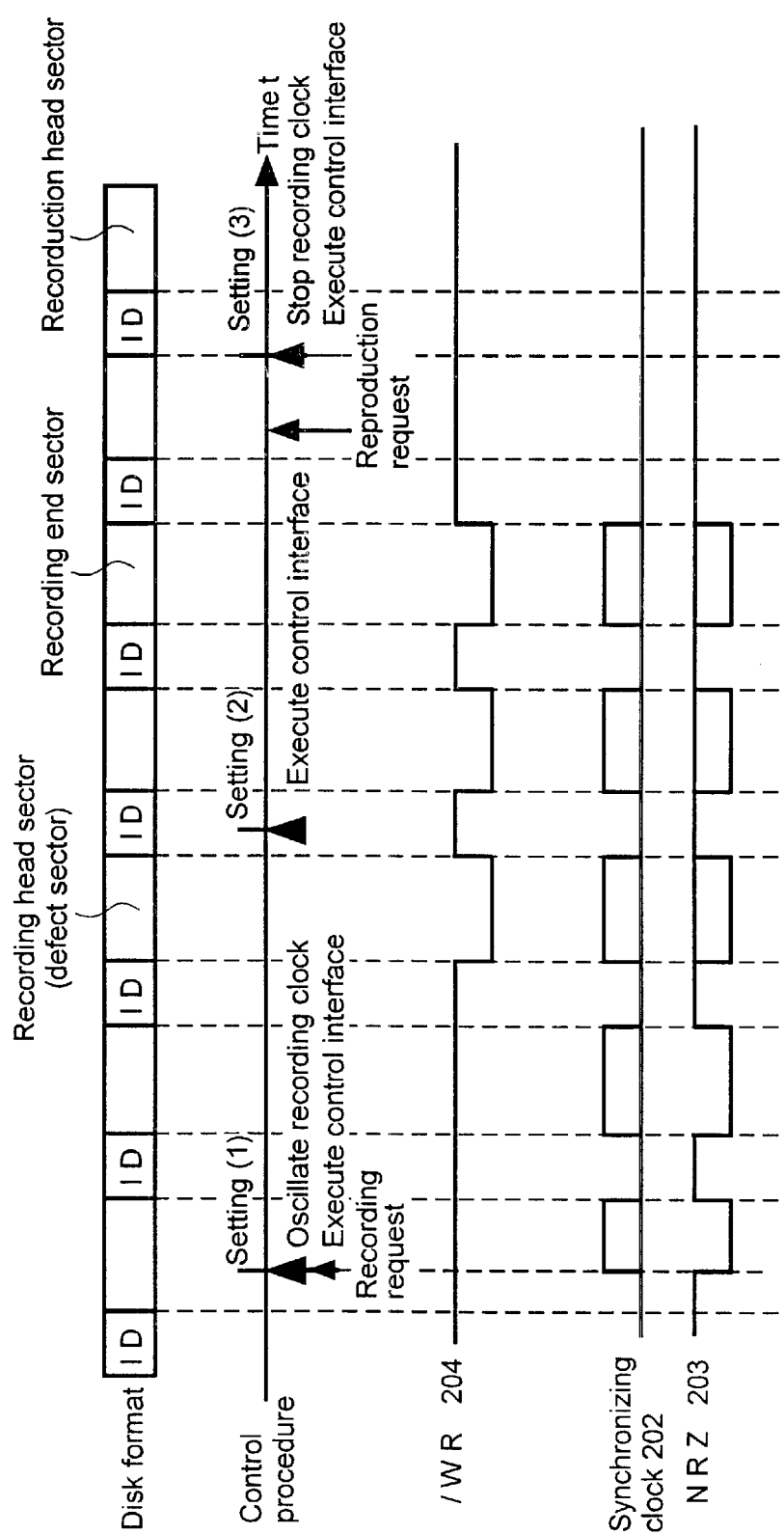
FIG. 12 is a diagram showing an example of an operation sequence in the information recording and reproducing apparatus of the first and second embodiments.

FIG. 12 is an example where a sector designated by the microprocessor 4 has a defect and recording is started at the next sector. In this case, the synchronizing clock 202 is provided in the deficient sector, and the shift to the setting (2) is performed within the ID reproduction period between the end of the deficient sector and the start of the actual recording sector.

Figure 13:
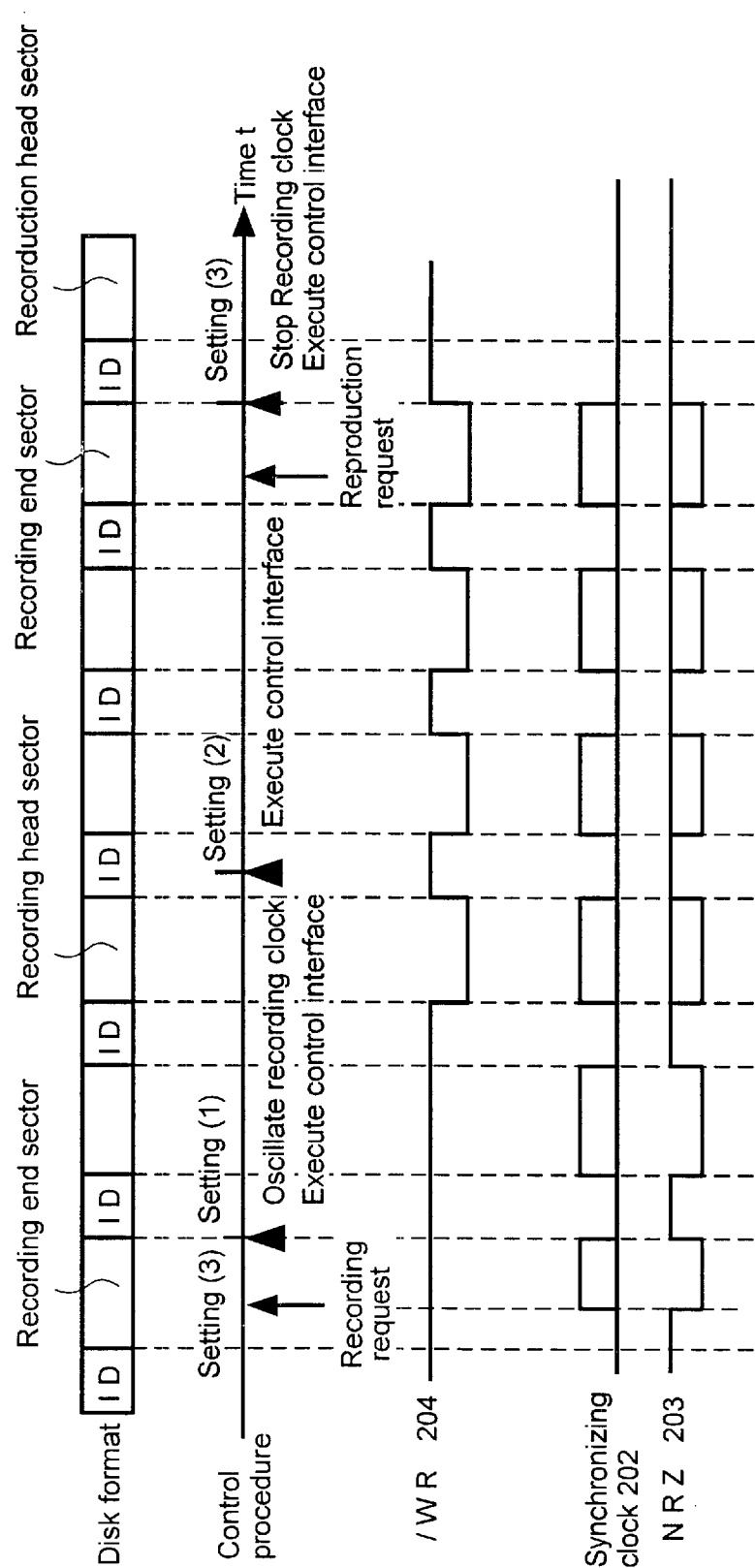
FIG. 13 is a diagram showing an example of an operation sequence in the information recording and reproducing apparatus of the first and second embodiments.

FIG. 13 is an example where the microprocessor 4 provides a recording request during a reproduction operation and a recording operation is started within a short period after the completion of the reproduction. Because the recording controller 8 is performing a reproduction operation when the recording request is received, the setting is not immediately shifted to setting (1), but the recording controller 8 changes the setting (1) after the reproduction sector. As in the above-described case, the shift to setting (2) is made after the recording head sector.

Figure 14:
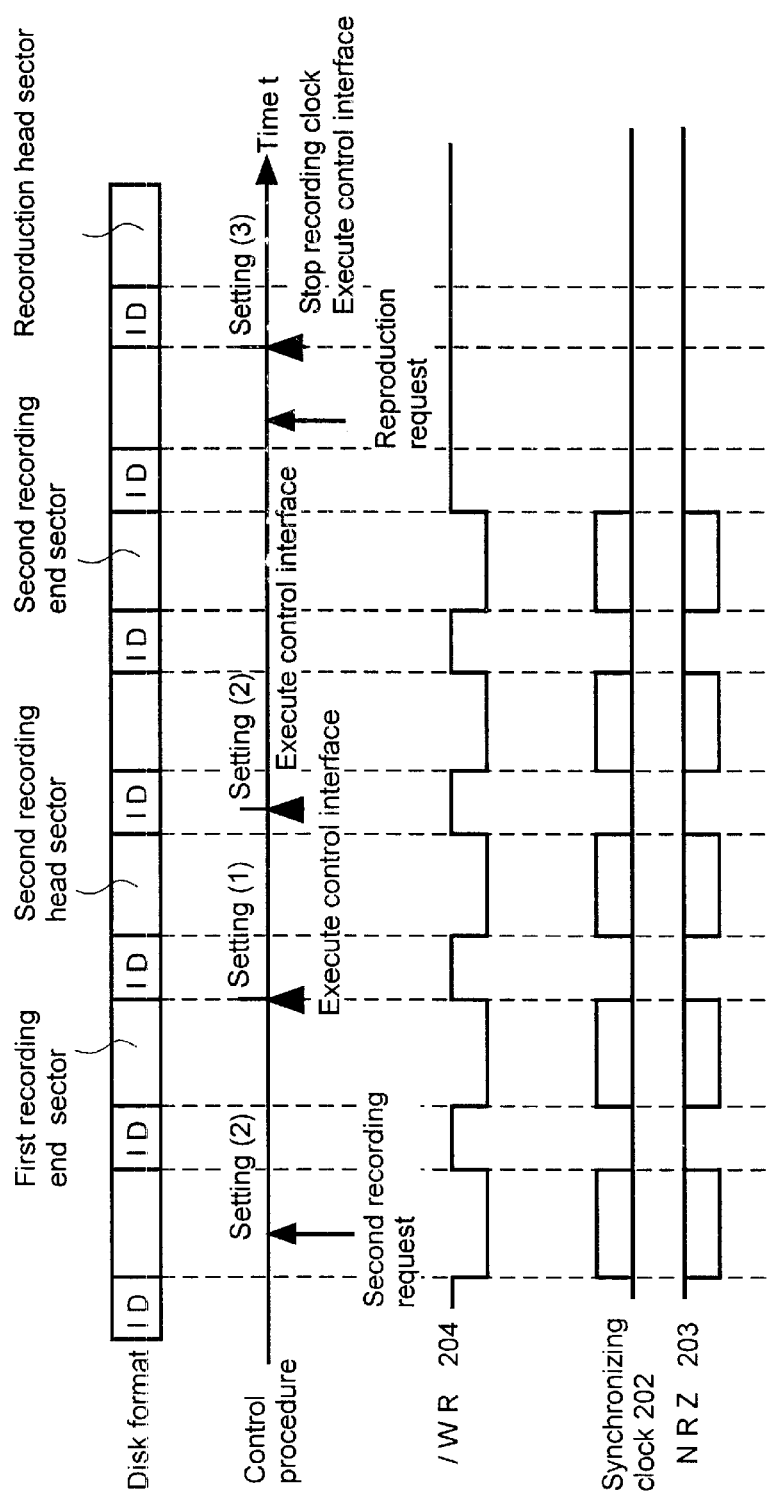
FIG. 14 is a diagram showing an example of an operation sequence in the information recording and reproducing apparatus of the first and second embodiments.

FIG. 14 is an example where a second recording command is set during a recording operation based on a first recording command (recording request), and the recording operation is continued without shifting to a reproduction operation. In this case, because a reproduction command is not set, the setting is not shifted to the setting (3), but is shifted to setting (1) after the end recording sector in the preceding recording operation. Then, after the recording head sector in the subsequent recording operation, the setting is shifted to setting (2).

Figure 15:
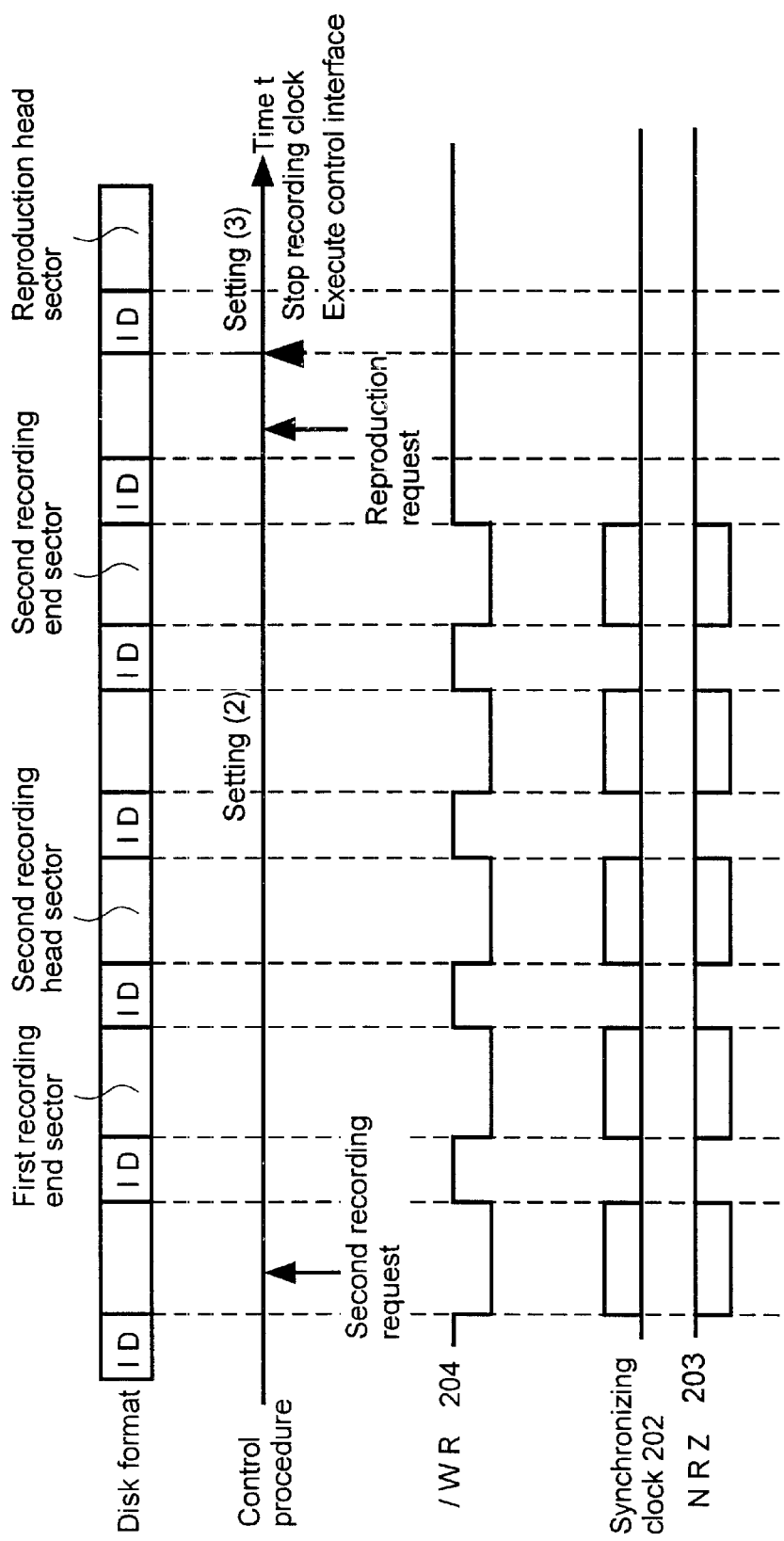
FIG. 15 is a diagram showing an example of an operation sequence in the information recording and reproducing apparatus of the first and second embodiments.

FIG. 15 shows another control method with a similar situation to FIG. 14. If the recording operation is continued, the setting (2) set in the preceding recording operation is continued without changing the setting (without issuance of the trigger signals 1 and 2 in the second embodiment).

FIG. 16 shows a laser waveform generating method for an information recording and reproducing apparatus. In FIG. 16, a modulator 6' performs encoding on recording information sent from a higher level device (not shown) by a predetermined modulation method. An emission current for a laser diode 3 is turned on and off based on a control signal by current switches 111 to 113 provided in laser driver 11'. A current adder 114 adds the currents supplied from the plural current switches. Control signals 1 to 3 (214 to 216) are provided from a waveform generator 10', and included in the modulator 6'.

Figure 17:
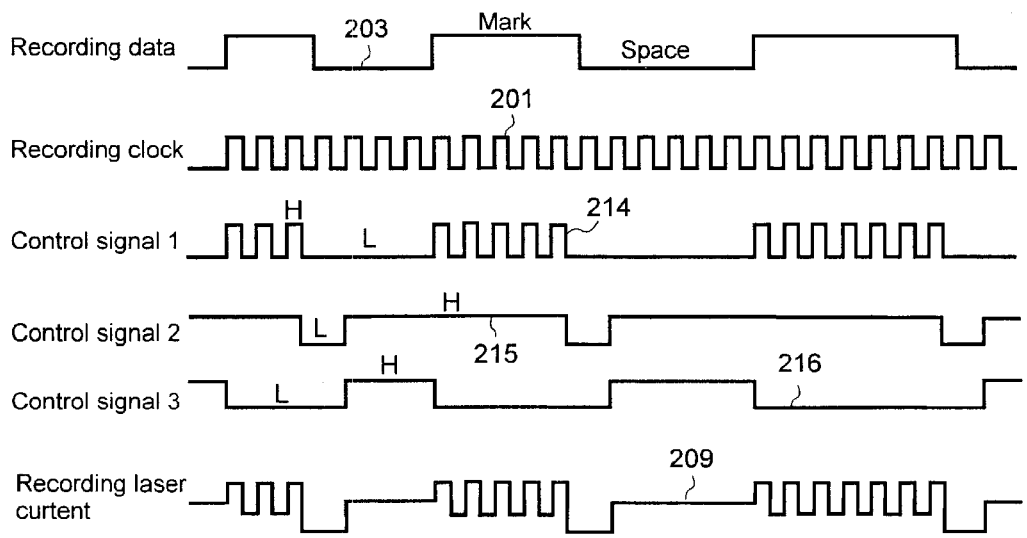
FIG. 17 is a timing diagram showing timing of a modulator (laser waveform generator) and a laser driver.

FIG. 17 is a timing diagram of an example of recording data 203 after modulation and the control signals 1 to 3. In FIG. 17, "mark" is a portion where high laser power irradiates a medium to cause a large amount of change, and "space" is a portion where lower laser power irradiates the medium to cause, or not to cause, a small amount of change. In this waveform example, when a mark is being recorded, laser emission is controlled at the same period as that of a recording clock 201. At the end of the mark, the laser power is lowered, and after two recording clock periods, the laser power is reduced to the space level.

To generate this laser emission waveform, the control signals are as follows. Control signal 1 (214) with the same period as that of the recording clock 201, is provided only in the mark portion. Control signal 2 (215) operates between the end of the mark and the front end of the space in a direction to cut off the current, while control signal 3 (216) operates to pass the current through from the rising edge of the control signal 2 through the space portion to the end of the mark portion. These control signals are generated in correspondence with recording data 203. As the current switches 111 to 113 operate to pass predetermined currents when the levels of the control signals are "H", as a recording laser current 209, a high current in a pulse emission region is the result of addition of the current passed by the current switch 1 and the current passed by the current switch 2, while a low current is only the current passed by the current switch 2. In a cool-down region, when all the current switches are turned off, no current flows. In an erase region, as the current switches 2 and 3 pass currents, the recording laser current is the sum of addition of both currents.

In the above-described laser waveform generation method, it is necessary to supply a plurality of control signals synchronized with recording data to current switches. Further, to control the laser at a high frequency, generally, the current switches are provided near the laser. Thus, they are preferably mounted on an optical pickup unit where laser, optical parts, a laser positioning control mechanism and the like are integrated. The current switches are positioned away from a signal processor including the modulator and the waveform generator. In the above-described example of FIG. 16, the control signals 1 to 3 (214 to 216) from the modulator 6' (the waveform generator 10') are transmitted via a signal line, such as a flexible cable, to the laser driver 11'.

In a DVD (Digital Versatile Disc) or the like, and in information recording and reproducing apparatus, the increase in density of recording medium and the increase in recording/reproduction processing speed of the information recording and reproducing apparatus are occurring. With the development of such increases in recording medium density and processing speed, the precision of signals must be further improved by increasing the signal frequency, reducing the signal delay time and the like. However, in conventional laser waveform generation methods, it is difficult to respond to these requirements, and a laser driving waveform generator with a new construction is needed.

The preceding has been a description of the preferred embodiment of the invention. It will be appreciated that deviations and modifications can be made without departing from the scope of the invention, which is defined by the appended claims.

What is claimed is:

1. An information recording and reproducing apparatus comprising:
   a modulator for generating recording data to be recorded onto a recording medium using a synchronizing clock;
   a recording waveform generator, including a recording clock generator which generates a recording clock based on the synchronizing clock, for changing a laser emission based on the recording clock and the recording data; a recording controller coupled to the modulator and to the recording waveform generator for controlling them; and
   wherein the recording clock generator has a clock generation/stop function and a response speed changing function, and wherein the recording controller provides a clock generation/stop control signal and a response speed changing signal, and controls the recording clock generator with at least one of the clock generation/stop control signal and the response speed changing signal,
   wherein the clock generation/stop control signal and the response speed changing signal are provided depending on an operating mode of the information recording and reproducing apparatus.

2. The information recording and reproducing apparatus according to claim 1, wherein the recording controller controls the modulator and the recording waveform generator, and wherein upon reproduction of data, the recording controller stops generation of the recording clock and the synchronizing clock with the clock generation/stop control signal, and further wherein upon recording data, the recording controller generates the recording clock and the synchronizing clock, and upon start of recording, sets the response speed to a high speed, and sets the response speed to a low speed after elapse of a predetermined period.

3. The information recording and reproducing apparatus according to claim 2, wherein, in the recording medium, regions where predetermined information are recorded are provided as sectors, each sector having a head where an address signal indicative of the position of the sector is recorded in advance, and wherein the response speed is changed within an address signal period between after the end of recording for the sector and the start of recording for the next sector.

4. The information recording and reproducing apparatus according to claim 1, wherein the response speed changing function is performed by changing the ratio between a frequency of the recording clock and the synchronizing clock, and wherein a constant of a circuit of the recording clock generator and a frequency of the synchronizing clock are changed.

5. An information recording and reproducing apparatus comprising:
   a signal processor having a recording data generator which generates recording data to be recorded onto a recording medium, a synchronizing clock generator which generates a synchronizing clock, and an address signal detector which detects an address signal recorded on the recording medium;
   a recording waveform generator having a recording clock generator for generating a recording clock based on the synchronizing clock and a control interface receptor, for changing a laser emission based on the synchronizing clock and the recording data;
   a control interface transmitter for controlling the recording waveform generator; and
   a system control for performing a control operation within the apparatus based on an instruction from an external device, and
   wherein the recording clock generator has a clock generation/stop function and a response speed changing function, and wherein the system controller transmits a clock generation/stop instruction and a response speed change instruction to the control interface receptor by the control interface transmitter depending on whether a recording operation or a reproduction operation is being performed, to control the recording clock generator.

6. The information recording and reproducing apparatus according to claim 5, wherein a control interface between the control interface transmitter and the control interface receptor comprises a serial interface that sequentially transmits and receives instruction information on a single signal line in 1-bit units.

7. The information recording and reproducing apparatus according to claim 5, wherein upon reception of a reproduction instruction from an external device, the system controller controls the recording waveform generator to enter a recording clock stop state via the interface receptor, before a sector designated by the reproduction instruction comes, while upon reception of a recording instruction from the external device, the system controller controls the recording waveform controller to enter a recording clock generator state via the control interface receptor and a high speed response state, before a sector designated by the recording instruction comes, and after recording was started and recording for a predetermined sector has been made, controls the recording waveform generator to a low speed response state.

8. An information recording and reproducing apparatus comprising:
   a signal processor having a recording data generator for generating recording data to be recorded onto a recording medium, a synchronizing clock generator for generating a synchronizing clock, a recording controller and an address signal detector;
   a recording waveform generator, having a clock generator for generating a recording clock based on the synchronizing clock and control interface receptor, for changing the amount of laser emission based on the synchronizing clock and the recording data;
   a control interface transmitter for controlling the recording waveform generator;
   an automatic execution circuit for the control interface transmitter; and
   a system controller for performing a control operation within the apparatus by an instruction from an external device, wherein the recording clock generator has a clock generation/stop function and a response speed changing function, and wherein the system controller controls the automatic execution circuit via the recording controller, further wherein the automatic execution circuit transmits previously-determined clock generation/stop instructions and response speed changing instructions to the control interface receptor by the control interface transmitter, to control the recording clock generator, wherein a particular previously-determined clock generation/stop instruction and response speed changing instruction are transmitted based on an operating mode, including a recording mode and a reproducing mode.

9. The information recording and reproducing apparatus according to claim 8, wherein in the system controller, a plurality of state settings to be transmitted to the recording waveform generator are stored in the automatic execution circuit in advance.

10. The information recording and reproducing apparatus according to claim 8, wherein if a reproduction instruction is sent from the external device, the system controller outputs the reproduction instruction to the recording controller, and the recording controller outputs a reproduction state setting transmission instruction to the automatic execution means, after end of a recording end sector if recording operation is performed upon reception of the reproduction instruction, or after a sector upon reception of the reproduction instruction if recording operation is not performed then, to control the automatic execution means.

11. The information recording and reproducing apparatus according to claim 8, wherein if a recording instruction is sent from the external device, the system controller outputs a recording instruction to the recording controller, and the recording controller outputs a recording state start setting transmission instruction to the automatic execution means, after an end of a reproduction end sector if recording operation is performed upon reception of the reproduction instruction, after end of a recording end sector if recording operation is performed upon reception of the reproduction instruction, or immediately if reproduction operation and recording operation are not performed, and wherein the automatic execution means performs response speed changing setting on the recording controller after recording was started and recording for a predetermined sector has been made.

12. The information recording and reproducing apparatus according to claim 11, wherein the recording controller does not output the recording state start setting transmission instruction and a response speed changing setting transmission instruction to the automatic execution circuit if recording operation is performed upon reception of the recording instruction.

13. An information recording and reproducing apparatus for recording information onto a recording medium while changing the amount of laser emission provided in a movable optical pickup unit, comprising:

a modulator that generates recording data to be recorded onto the recording medium using a synchronizing clock;

a recording waveform generator, having a recording clock generator that generates a recording clock based on the synchronizing clock, that changes the amount of laser emission based on the recording clock and the recording data; and a controller that controls the modulator and the recording waveform generator, wherein the recording waveform generator is formed on a circuit board of the optical pickup unit, and wherein the modulator and the controller are formed on a circuit board other than that of the optical pickup unit, further wherein the recording clock generator generates or stops the recording clock based on control by the controller, to change a circuit characteristic, wherein the controller controls the modulator and the recording waveform generator based on an operating mode of the information recording and reproducing apparatus.

14. The information recording and reproducing apparatus according to claim 13, wherein the recording clock generator generates the recording clock based on the synchronizing clock sent via a flexible cable.

15. The information recording and reproducing apparatus according to claim 13, wherein a frequency of the recording clock is higher than that of the synchronizing clock.

* * * * *